Figure 1:
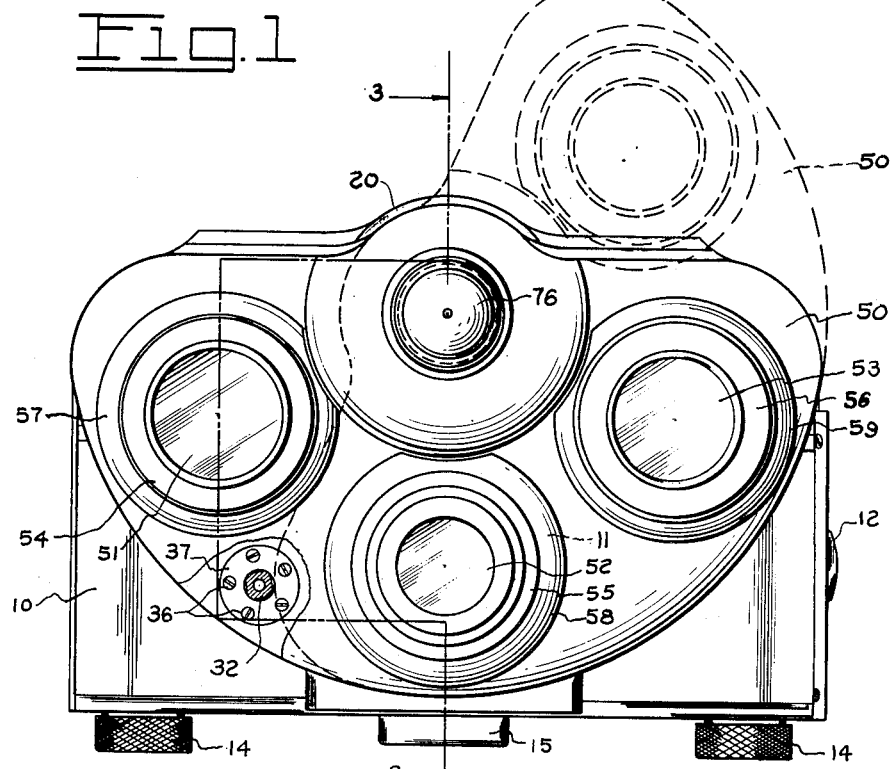

June 3, 1952 — J. A. HAESELER — 2,599,327
CAMERA WITH LENS TURRET
Filed Dec. 21, 1946 — 2 SHEETS—SHEET 1

INVENTOR.
John A. Haeseler
BY Emery, Varney,
Whittemore & Dix

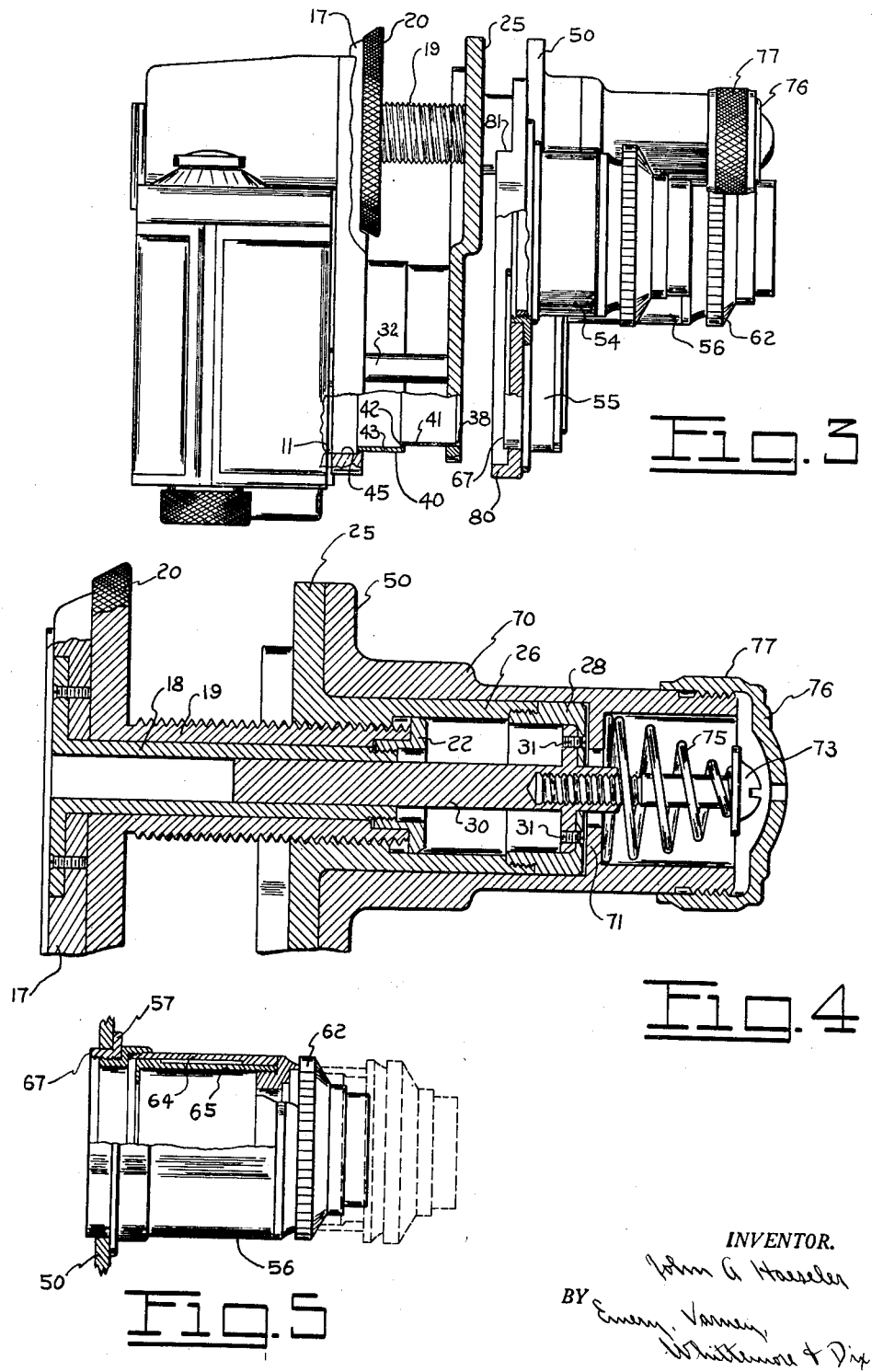
June 3, 1952     J. A. HAESELER     2,599,327
CAMERA WITH LENS TURRET
Filed Dec. 21, 1946     2 SHEETS—SHEET 2

Patented June 3, 1952

2,599,327

UNITED STATES PATENT OFFICE 2,599,327

CAMERA WITH LENS TURRET

John A. Haeseler, Woodbridge, Conn.

Application December 21, 1946, Serial No. 717,683

8 Claims. (Cl. 95—45)

1

The purpose of this invention is to provide a compact and efficient camera turret which is suitable for still cameras as well as motion picture cameras and has as one of its principal features a central focusing device which makes its application especially economical by eliminating the need for focusing mounts on the individual lenses.

Multiple lens turrets have been a recognized adjunct to motion picture photography for professionals and advanced amateurs for many years. In making still pictures many photographers, of course, work with additional lenses and developments of recent years have increased the demand for having these lenses readily available, as well as the benefits which may accrue if they are.

With the advent of miniature cameras and other well-built small cameras it became practical, and often advisable and necessary, to work with more than one lens. With larger cameras this was not practical for the lenses were of relatively long focal length and their weight together with needed tube or bellows extension added considerably to equipment already heavy; and the fact that compositions could be altered in the darkroom, and portions of the negative selected and enlarged, reduce the need for a choice of lenses. Miniature and small cameras made it possible to approximate more closely the picture in its finished form. Additional lenses were not too heavy or bulky to be included in easily portable equipment and it became practical to have lens equipment which would permit in the field a range of selection for composition, magnification and perspective. Fine grain emulsions increased the practicability of small size pictures but the limited dimensions also made it imperative, or at least highly advisable, that the full picture area be utilized if possible. And in the case of color photography, where changes in composition and perspective are difficult or impossible in the darkroom, particularly as in photographing with Kodachrome for projection, it is necessary to take the pictures in the form in which they are to appear.

There is in fact a definite mode or work which has developed in still photography, particularly in color, of taking photographs in the field in their final form just as has been the custom in motion picture photography and this means having readily available the lenses usually necessary for controlling problems of distance and perspective and permitting choice of emphasis for objects in the foreground or background.

2

Carrying additional lenses and readily employing them has always presented serious problems to the photographer. Either each lens with its mount must have its own case or a place must be provided in the camera case. Unless precautions are taken to keep both the lens and the other end of the mount covered when they are not in use the lens frequently needs cleaning before it can be employed, and the cleaning should extend to both surfaces more often than it does. In addition to the cleaning there are the delays involved in getting the lens out, detaching the other from the camera, and putting it on. Then there is the problem of where to put the lens that was on the camera and how to keep dust from it while the other lens is being employed, and after taking the picture there is the bother incurred in replacing the lens in its case and putting the other lens back on the camera, always of course without dust getting in the camera during any of these changes. In addition to the factors of delays and dirt, the mobility of the photographer is frequently impaired by not having his case and lenses in such shape that he can move about.

A turret is the only satisfactory solution to the problems of working with multiple lenses. The present invention provides a turret that not only makes it possible to bring the lenses immediately into position for photography, and protects the backs of the lenses from dust when in a carrying position, but that takes up minimum space and is readily adaptable both to still cameras and to motion picture cameras. The shape of the turret in addition to making the space requirements similar to those needed by the camera makes it possible to operate readily the central focusing device. This not only supplants the separate focusing mounts on the lenses but affords a single and convenient focusing control which adds to facility and speed of operation. Smoothness and accuracy in focusing are assured by the direct operation of a multiple lead thread without the intervention of gears. Other features of the invention provide means for keeping the turret and lenses rigid at any position, and make possible unusual amounts of extension for photographing close-ups.

Other objects, features and advantages of the invention will appear or be pointed out as the description proceeds.

Figure 2:
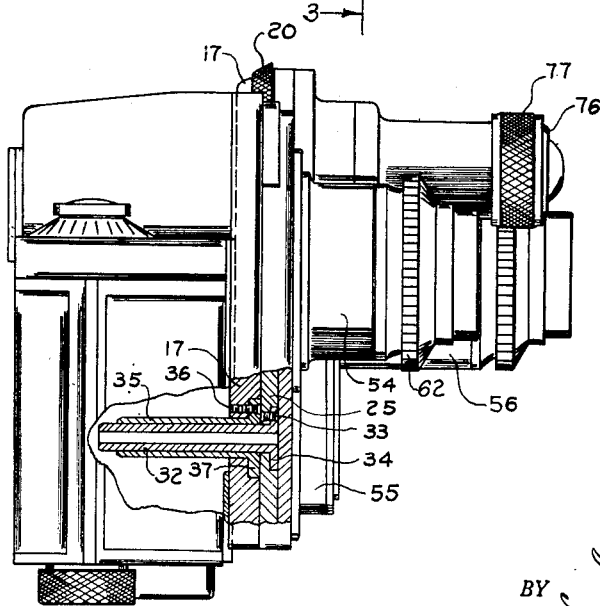

In the drawing, forming a part hereof, in which like reference characters indicate corresponding parts in all the views, Figure 1 is a front elevation, partly broken away, of a camera equipped with a lens turret and embodying this invention, Figure 2 is an end view, partly broken away and in section, of the camera shown in Figure 1, Figure 3 is an end view, similar to Figure 2, but with different parts shown in section, and with the lens turret moved forward for focusing and for turning the turret to bring a different lens into operative position, Figure 4 is an enlarged sectional view through the supporting structure for the turret assembly, Figure 5 is a side view, mostly in section, of one of the lens mounts.

The camera includes a casing 10 having a lens opening 11 through which light from a lens enters the casing to expose the film. The camera has a removable back, which is locked in position by a latch 12, and has knobs 14 for winding the film, and a boss 15 on the bottom of the casing for receiving a tripod screw. These and other features of the camera are conventional.

To the front of the casing 10 there is connected a fixed frame 17, and a stud or post 18 (Fig. 4) extends forward from the fixed frame 17 and serves as a supporting bearing for a focusing sleeve 19. The fixed frame 17 can be considered a part of the casing 10.

The focusing sleeve 19 has a knurled knob 20 at its inner end for turning the sleeve, and substantially the entire length of the sleeve 19 beyond the knob is threaded. The focusing sleeve 19 is held against endwise displacement on the post 18 by a nut 22 threaded over the outer end of the post 18 and having a flange that extends into position to abut against the outer end wall of the focusing sleeve 19.

The turret assembly includes a plate or focusing frame 25 having an opening threaded to fit the threads of the focusing sleeve 19 so that as the sleeve 19 is rotated, the focusing frame 25 moves along the focusing sleeve 19 toward or from the knob 20 depending upon the direction of rotation of the knob. A hollow hub 26 of the focusing frame 25 gives the focusing frame a substantial length of bearing along the threaded focusing sleeve for resisting any force that tends to tilt the focusing frame. The focusing frame and the turret always remain normal to the axis of the post 18. The hub 26 provides a chamber for the nut 22, and the end of this chamber is closed by a cap 28 that threads into the end of the hub 26.

A rod 30 is secured to the cap 28 by screws 31 extending into a flange that is integral with the outer end portion of the rod 30, and this rod slides in the post 18 as a bearing. In practice the rod 30 is lapped into the post 18 to provide a high grade bearing that maintains all positions of the focusing frame parallel.

In order to prevent the focusing frame 25 from turning on the focusing sleeve 18, there is a stud 32 secured to the frame 25 by screws 33 (Fig. 2) which extend through a flange 34 integral with the outer end of the stud 32. This stud slides in a sleeve 35 attached to the front wall of the camera casing 10 by screws 36 extending through a flange 37 on the end of the sleeve 35. The sleeve 35 is preferably of round section and the stud 32 is of generally square cross section with rounded corners that slide along the sleeve 35 as a bearing. This construction reduces the friction of the stud 32 in the sleeve 35.

There is a lens opening 38 (Fig. 3) in the focusing frame 25 and in line with the lens opening 11 of a camera casing. A light trap 40 is located between the fixed frame 17 and the focusing frame 25. This light trap includes a forward cylindrical section 41 attached to the focusing frame 25 within the opening 38, but the forward cylindrical section 41 does not extend all the way to the front of the opening 38. Some space is purposely left for receiving the rearward end of a lens mount in order to hold the lens mount in register with the opening 38.

A lip 42 at the rearward end of the forward cylindrical section 41 fits in behind a complementary lip on the forward end of a rearward cylindrical section 43 of the light trap.

The rearward cylindrical section 43 has a lip at its inner end which extends behind a complementary lip at the forward end of an opening 45 in the fixed frame 17 immediately in front of the lens opening 11 of the camera casing. The cylindrical sections 41 and 43 form a telescoping light trap that extends and contracts as the focusing frame 25 is moved away from and toward the fixed frame 17 on the front of the camera casing.

The construction shown for the light trap 40 is merely representative of light traps. Various other constructions can be employed and the term "light trap," as used in the description and claims, is used in a broad sense to designate any structure for preventing the entrance of light into the lens opening of the camera through the space between the focusing frame 25 and the fixed frame 17 when the focusing frame is in a position spaced from the fixed frame.

The turret assembly includes also a turret 50 on which different lenses are carried. Figure 1 shows three lenses 51, 52 and 53 in lens barrels 54, 55 and 56 respectively. These lens barrels 54, 55 and 56 screw into lens mounts 57, 58 and 59, respectively, secured to the front of the turret 50.

In the preferred embodiment of the invention, the support about which the turret rotates is located near the upper edge of the front of the camera casing, and the turret 50 comprises little more than a semi-circle so that the vertical height of the camera is not substantially increased by the turret assembly. When the lens 51 is to be brought into operative position in front of the lens opening 11, the turret 50 is turned into the dotted line position shown in Figure 1, and in this position the turret extends for a substantial distance above the top of the camera casing. Likewise, when the lens 53 is to be brought into operative position in front of the lens opening 11, the turret 50 is turned in the other direction and extends for a substantial distance above the top of the camera casing on the other side. When the camera is in use there is no objection to having the ends of the turret extend above the top of the camera casing, however, when the camera is not in use, and is to be put in its case, the turret 50 can always be put in its middle position, indicated by full lines in Figure 1.

Figure 5 shows the construction of one of the lens barrels and its connection with the lens mount. The lens barrel 56 has a ring 62 for opening and closing the iris diaphragm of the lens in a well understood manner, and has two telescoping sleeves 64 and 65 that permit the lens to be advanced, as indicated in dotted lines in Figure 5, for preliminary focusing. By using telescoping lens barrels from which part of the focusing movement can be obtained, it is not necessary to have as much movement of the focusing frame, and the turret assembly can be of reduced length so that better balance of the camera is obtained. In the case of relatively long focus lenses, such for example as a 5 inch lens, the telescoping feature can be used to bring the lens out into position for focusing. In the case of the 3 inch lens the feature can be used to secure additional extension for photographing closeups.

The lens barrel 56 screws into the lens mount 59. Each of the lens mounts has a rearward end portion 67 which is of the same diameter for all of the lens mounts of the turret, and each of these rearward end portions 67 extend for a short distance beyond the inside wall of the turret 50, as best shown in Figure 3. The rearward end portion 67 fits snugly into the opening 38 and its engagement in the opening 38 centers the lens mount in direct alignment or register with the lens opening 11 of the camera casing, and holds the turret in position.

When the lens turret 50 is to be turned to withdraw one lens mount from the opening 38 and to swing the turret into position to bring a different lens into alignment with the opening 38 of the focusing frame, the lens turret 50 must be pulled forward far enough to disengage the lens mount from the opening 38. Figure 3 shows the turret 50 pulled away from the focusing frame 25 to the fullest extent possible. It will be evident that this is considerably more than is necessary to permit the turret to be rotated.

Figure 4 shows the structure for holding the turret 50 in contact with the focusing frame 25. A hub 70 of the turret 50 fits over the hub 26 of the focusing frame. This hub 70 has an inwardly extending flange 71. A screw 73, that threads into the outer end of the rod 30, compresses a spring 75 against the inwardly extending flange 71 and thus urges the turret 50 into contact with the focusing frame 25. A cap 76 threads over the end of the turret hub 70. A band of knurling 77 on the periphery of the cap 76 serves as a knob by which the turret hub 70 is gripped to pull the turret 50 away from the focusing frame 25 and for turning the turret to bring different lenses into operative position.

The turret 50 has a rearwardly extending lip 80 that overlaps the peripheral edge of the focusing frame 25 around the bottom and sides of the turret 50, but this lip 80 terminates at a shoulder 81, on each side of the assembly, so as to leave more clearance at the top of the frame 25 for access to the focusing knob 20. This focusing knob extends far enough beyond the surrounding structure for convenience rotation by the operator's finger regardless of the position of the lens turret 50.

The preferred embodiment of the invention has been illustrated and described, but changes in the construction can be made, and some features can be used in different combinations without departing from the invention as described in the claims.

I claim as my invention:

1. A camera comprising a casing, a fixed frame rigidly connected with the casing, a lens opening through the casing and fixed frame for admitting light into the casing to expose a film, a hollow post extending from the fixed frame, a rod that fits the interior of the hollow post with a lap fit and that is slidable lengthwise in the post, a focusing frame rigidly connected with the outer end portion of the rod, a focusing sleeve that fits over the outside of the post and that rotates on the post as a bearing, a stop element threaded over the outer end of the post in position to prevent endwise displacement of the focusing sleeve on the post, a knob for rotating the focusing sleeve, threads on the outside surface of the focusing sleeve, a hub on the focusing frame having a portion that threads over the focusing sleeve for moving the focusing frame lengthwise along the focusing sleeve as the later is rotated, a bearing surface on the outside of the focusing frame hub, a turret with mounts for a plurality of lenses, a turret hub that fits over the focusing frame hub to provide a bearing on which the turret can be turned to bring different lens mounts in line with the lens openings of the camera casing and fixed frame, a spring in the turret hub with its inner end in contact with a portion of the turret hub, a screw having an outer head portion for compressing the spring and having a threaded inner end that screws into the rod so that the turret is urged toward the fixed frame at all times, a rim extending rearwardly from each of the lens mounts on the turret, and an opening through the focusing frame in alignment with the lens opening of the camera and comprising a socket into which each of the rims of the turret lens mounts can be successively engaged.

2. A camera comprising a casing, a fixed frame rigidly connected with the casing, a lens opening through the casing for admitting light into the casing to expose a film, a hollow post extending from the fixed frame, a rod that fits the interior of the hollow post and that is slidable lengthwise in the post, a focusing frame connected with the outer end portion of the rod, a focusing sleeve that fits over the outside of the post and that rotates on the post as a bearing, a stop element at the outer end of the post in position to prevent endwise displacement of the focusing sleeve on the post, a knob for rotating the focusing sleeve, threads on the outside surface of the focusing sleeve, a hub on the focusing frame having a portion that threads over the focusing sleeve for moving the focusing frame lengthwise along the focusing sleeve as the later is rotated, a bearing surface on the outside of the focusing frame hub, a turret with mounts for a plurality of lenses, a turret hub that fits over the focusing frame hub to provide a bearing on which the turret is movable axially and can be turned to bring different lens mounts in line with the lens opening of the camera casing, a spring urging the turret toward the fixed frame at all times, a rim extending rearwardly from each of the lens mounts on the turret, and an opening through the focusing frame in alignment with the lens opening of the camera and comprising a socket into which each of the rims of the turret lens mounts can be successively engaged.

3. A camera comprising a casing, a fixed frame rigidly connected with the casing and including a supporting structure extending forwardly from the casing, the casing having a lens opening for admitting light into the casing to expose a film, a movable assembly that fits bearings on the supporting structure and that is movable lengthwise along the supporting structure, a focusing frame comprising a part of the movable assembly and having means that prevent it from turning on the supporting structure along which said frame is movable to focus the camera, a focusing element carried by the supporting structure as a bearing, a stop in position to prevent endwise displacement of the focusing element on the supporting structure beyond a predetermined limit, the focusing element including means to move it on the supporting structure to move the focusing frame forwardly and rearwardly on said supporting structure in response to the movement of the focusing element, the focusing frame having a longitudinally extending bearing portion on the focusing element for moving the focusing frame lengthwise along the focusing element as the latter is moved on the supporting structure, a turret comprising a part of the movable assembly and having mounts for a plurality of lenses, a bearing in said movable assembly on which the turret is movable with respect to the focusing frame and on which the turret can be turned to bring different lens mounts into line with the lens opening in the camera casing, and means normally urging the turret into position adjacent to the focusing frame, said focusing frame having an opening through it in alignment with the lens opening of the camera and in front of which each of the turret lens mounts can be selectively located.

4. A camera as described in claim 3, in which the means that prevents the focusing frame from turning on the supporting structure comprises a stud spaced from the supporting structure, and a bearing in which the stud slides, one of which is carried by the camera casing and one of which is carried by the focusing frame to prevent rotation of the focusing frame with respect to the camera casing, and in which there is a light trap located around the edges of the exposure opening and the opening through the focusing frame, said light trap being expandible and contractible with movement of the focusing frame toward and from the camera casing.

5. The camera described in claim 3, in which the supporting structure includes a post that extends forwardly through both the focusing frame and the turret and which comprises the support for both the focusing frame and turret, the turret being movable into an intermediate position in which it does not extend for any substantial distance above the top of the camera casing, and a bearing on which the turret is movable both axially and angularly with respect to the frame when the turret is to be moved to bring a different lens into operative position.

6. The camera described in claim 3, and in which the forwardly extending supporting structure is located near one side of the front of the camera, and a focusing frame and turret are both located unsymmetrically about the supporting structure and in front of the camera casing, the turret having only limited extent beyond the sides of the camera casing.

7. The camera described in claim 3, in which there is provided a light trap around the lens opening and located between the casing and the focusing frame, the light trap including a portion connected to the focusing frame and surrounding said opening in the frame, and another portion connected with the casing and surrounding the lens opening in the casing, the turret being movable axially on the focusing frame, and in which an end portion at the rearward end of each lens fits the forward end of the opening through the focusing frame and moves into and out of engagement with said opening in response to axial movement of the turret on said bearing.

8. The camera described in claim 3, in which a portion of the supporting structure comprises a hollow post extending forward from the fixed frame and through the movable assembly that fits the bearings on the supporting structure and that is movable lengthwise along the supporting structure, and in which the post extends through the focusing frame and the turret of said assembly, the lens mounts being connected to the turret in locations rearward of the forward portion of the post.

JOHN A. HAESELER.

REFERENCES CITED

The following references are of record in the file of this patent:

UNITED STATES PATENTS

| Number | Name | Date |
| --- | --- | --- |
| 270,133 | Schmid | Jan. 2, 1883 |
| 481,343 | Bristol | Aug. 23, 1892 |
| 1,187,136 | Gall | June 13, 1916 |
| 1,767,849 | Howell | June 24, 1930 |
| 2,000,090 | Mitchell | May 7, 1935 |
| 2,005,014 | Tondreau | June 18, 1935 |
| 2,236,069 | Robinton | Mar. 25, 1941 |
| 2,327,859 | Bolsey | Aug. 24, 1943 |
| 2,495,355 | Stahl | Jan. 24, 1950 |

FOREIGN PATENTS

| Number | Country | Date |
| --- | --- | --- |
| 379,653 | France | Sept. 13, 1907 |
| 531,524 | France | Oct. 26, 1921 |
| 543,554 | France | June 7, 1922 |
| 561,865 | Germany | Oct. 19, 1932 |